P. L. GIBBS.
Improvement in Wrenches.
No. 132,823. Patented Nov. 5, 1872.
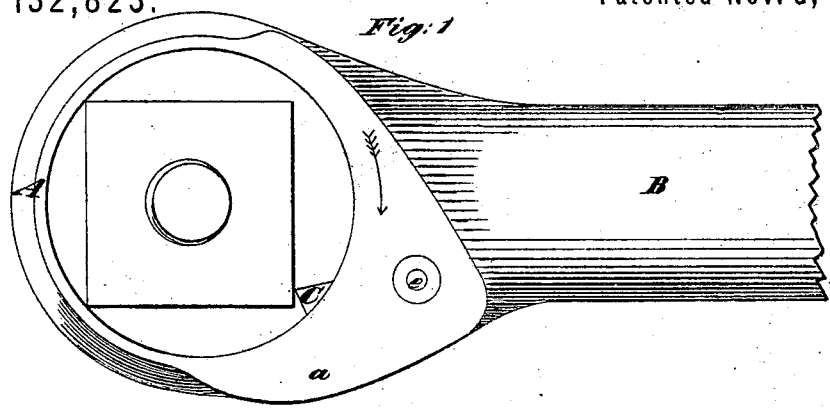
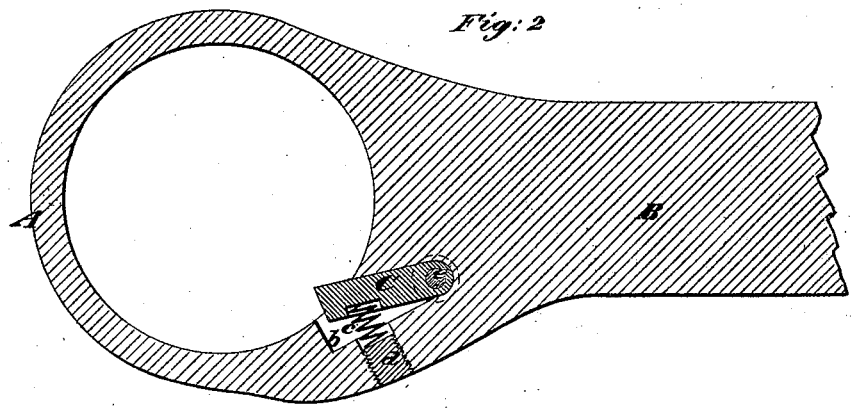
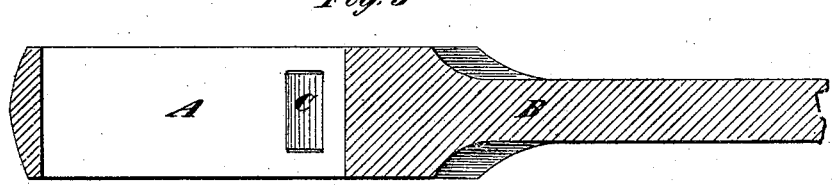

UNITED STATES PATENT OFFICE.

PIERRE L. GIBBS, OF CHICAGO, ILLINOIS.

IMPROVEMENT IN WRENCHES.

Specification forming part of Letters Patent No. 132,823, dated November 5, 1872.

*To all whom it may concern:*

Be it known that I, PIERRE L. GIBBS, of Chicago, in the county of Cook and State of Illinois, have invented an Improved Wrench, of which the following is a specification:

The object of this invention is to produce a simple, cheap, and effective substitute for a ratchet-wrench which, within certain limits, shall be applicable to different-sized nuts, and is especially useful and convenient for railroad purposes, for screwing and unscrewing the nuts of fish-plate joints, &c. It consists in the combination of a circular or ring-like socket provided with a suitable handle, a pawl-like dog pivoted within such socket, and a spring for making the dog project into the socket, whereby, if the socket be placed over a nut and worked back and forth, the latter will be screwed or unscrewed.

In the accompanying drawing, Figure 1 is a face view of a wrench made according to my invention; Fig. 2 is a facial section of the same; and Fig. 3 is a section taken longitudinally through the handle and transversely through the socket.

Similar letters of reference indicate corresponding parts in all the figures.

A is the socket of the wrench. It is of circular form, ring-shaped, and has formed on one side of its periphery a handle, B, which is thinner than the socket, so that the latter bulges out on each side of it. At the junction of the handle and socket, on one side or edge, there is a swell, $a$, opposite which, in the interior of the socket, is a recess, $b$, arranged tangentially or nearly so to the socket. This latter tapers toward its inner end, and at that point has pivoted within it, by a pin, $e$, a pawl-like dog, C, which is of sufficient length to project out of the open end of the recess into the socket. This it is made to do by means of a spiral spring, $c$, which is inserted in a suitable position behind the dog, through a hole opposite the recess in the back of the socket. The hole is afterward fitted with a screw-plug, $d$, against which said spring bears.

To screw up a nut with this wrench the socket is turned that side up which will bring the dog to the left of the handle, and is placed around the nut so that the dog $c$ bears against one of the faces thereof, as shown in Fig. 1. The handle is then worked back and forth a quarter of a revolution round the bolt, and, when moving in the direction of the pawl, toward the left, operates the nut; but when moving in the reverse direction the pawl slides past the nut without operating it—swinging into its recess as it passes the corners of said nut.

To unscrew a nut the socket is turned reverse side up, so that the swell $a$ comes to the right of the handle, and the operation is then exactly the reverse of that just described.

It is not necessary to look at the dog to decide which side up to place the socket to operate a nut, but it may readily be seen by noticing the swell, the wrench being always moved to turn the nut in the direction of the swell, as indicated by the arrow in Fig. 1. The dog has its thrust-bearing in the back of its recess, the pin $e$ being merely to retain it in place.

This wrench forms a very simple, cheap, and effective substitute for the ratchet-wrenches commonly used.

Claim.

The combination of the socket and handle, a pawl-like dog, and the spring, substantially as and for the purpose set forth.

PIERRE L. GIBBS.

Witnesses:
W. H. BARNUM,
GODFRAY SCHMID.